United States Patent
Huang (10) Patent No.: US 11,024,077 B2
(45) Date of Patent: Jun. 1, 2021

(54) GLOBAL ILLUMINATION CALCULATION METHOD AND APPARATUS

(71) Applicant: NETEASE (HANGZHOU) NETWORK CO., LTD., Zhejiang (CN)

(72) Inventor: Jiancong Huang, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 181 days.

(21) Appl. No.: 15/778,227

(22) PCT Filed: Aug. 5, 2016

(86) PCT No.: PCT/CN2016/093567
§ 371 (c)(1),
(2) Date: May 23, 2018

(87) PCT Pub. No.: WO2017/206325
PCT Pub. Date: Dec. 7, 2017

(65) Prior Publication Data
US 2020/0302683 A1  Sep. 24, 2020

(30) Foreign Application Priority Data
May 30, 2016 (CN) .......................... 201610371167.8

(51) Int. Cl.
*G06T 15/50* (2011.01)
*G06T 7/50* (2017.01)
(Continued)

(52) U.S. Cl.
CPC .............. *G06T 15/506* (2013.01); *G06T 3/40* (2013.01); *G06T 7/50* (2017.01); *G06T 15/06* (2013.01);
(Continued)

(58) Field of Classification Search
None
See application file for complete search history.

(56) References Cited

U.S. PATENT DOCUMENTS

| 2006/0066616 A1 | 3/2006 | Sevastianov et al. |
| 2007/0052704 A1* | 3/2007 | Pedley .................. G06T 15/405 345/422 |

(Continued)

FOREIGN PATENT DOCUMENTS

| CN | 101826214 A | 9/2010 |
| CN | 101882323 A | 11/2010 |

(Continued)

OTHER PUBLICATIONS

Herzog, Robert, Elmar Eisemann, Karol Myszkowski, and H-P. Seidel. "Spatio-temporal upsampling on the GPU." In Proceedings of the 2010 ACM SIGGRAPH symposium on Interactive 3D Graphics and Games, pp. 91-98. 2010 (Year: 2010).*

(Continued)

*Primary Examiner* — Steven Z Elbinger
(74) *Attorney, Agent, or Firm* — Gang Yu (57) ABSTRACT

A global illumination calculation method and apparatus is provided. The method includes: acquiring at least one of SDF information and illumination information corresponding to each of preselected pixels displayed on a screen, and the SDF information and illumination information corresponding to each pixel are stored in a two-dimensional map formed by mapping a three-dimensional map; and performing global illumination calculation according to at least one of the SDF information and the illumination information corresponding to each pixel. The method solves technical problems of global illumination calculation methods in the (Continued)

related art that a large amount of hardware resources are consumed and the presented image effects are not ideal enough.

16 Claims, 2 Drawing Sheets

(51) Int. Cl.
    *G06T 3/40*     (2006.01)
    *G06T 15/06*     (2011.01)
    *G06T 15/08*     (2011.01)
    *A63F 13/52*     (2014.01)

(52) U.S. Cl.
    CPC ............ *G06T 15/08* (2013.01); *G06T 15/503* (2013.01); *A63F 13/52* (2014.09); *A63F 2300/6615* (2013.01); *A63F 2300/6646* (2013.01); *G06T 2210/36* (2013.01)

(56) References Cited

U.S. PATENT DOCUMENTS

| | | | |
|---|---|---|---|
| 2007/0247460 A1* | 10/2007 | Smitt | G06T 15/506 345/427 |
| 2008/0279450 A1 | 11/2008 | Finlayson et al. | |
| 2009/0102843 A1* | 4/2009 | Sloan | G06T 15/503 345/426 |
| 2013/0342758 A1* | 12/2013 | Greisen | G06T 3/0012 348/441 |
| 2014/0184749 A1* | 7/2014 | Hilliges | G06T 17/00 348/47 |
| 2014/0347359 A1* | 11/2014 | Gruen | G06T 15/60 345/426 |
| 2016/0048726 A1* | 2/2016 | Tang | G06K 9/00355 382/103 |
| 2016/0155261 A1* | 6/2016 | Iborra Olba | G06T 15/04 345/426 |
| 2016/0189419 A1* | 6/2016 | Fakih | G06T 15/08 345/419 |

FOREIGN PATENT DOCUMENTS

| | | |
|---|---|---|
| CN | 102314703 A | 1/2012 |
| CN | 104484896 B | 1/2018 |

OTHER PUBLICATIONS

International search report for PCT application No. PCT/CN2016/093567 fled on Aug. 5, 2016, dated Dec. 7, 2017.
Search report of CN Priority application No. 201610371167.8 filed on May 30, 2016, dated Jun. 16, 2018.

* cited by examiner

GLOBAL ILLUMINATION CALCULATION METHOD AND APPARATUS

TECHNICAL FIELD

The present disclosure relates to the field of computer image processing, and in particular to a global illumination calculation method and apparatus.

BACKGROUND

Currently, global illumination has always been a hotspot in real-time game rendering. At least one image rendered by the global illumination not only has been considered an effect of directly emitting light from a scene light source to a consideration surface (i.e., object surface), but also further considered an illumination effect that the light from the scene light source is reflected by other surfaces and then hits the consideration surface. The global illumination plays a huge role in integration of an illumination reality of an object and a surrounding environment. In order to solve a global rendering equation, the global illumination performs multiple iterative integrations without an analytical solution, and thus a numerical solution just can be obtained according to methods of Monte Carlo-related integration. In view of that a calculation amount of an accurate global illumination algorithm is very large, implementation methods are commonly used in two major types of namely offline and real-time technical solutions.

The offline global illumination method is mainly applied to production of movies, game Computer Graphics (CGs), and animated short films. Since these technologies generally have a more abundant amount of computation and there is no requirement of real-time game running, the offline global illumination method may achieve a photo rendering quality, and to re-approach real illumination effects in combination with optical knowledge. A core algorithm used for the offline global illumination method includes: a Path Tracing and a Photon Mapping. A main feature of these off-line calculation methods is that an illumination intensity calculation is accurate, including multiple reflections. However, an amount of the illumination intensity calculation is large, and the illumination intensity calculation usually takes tens of minutes to render a frame of results. The Path Tracing is an optical path tracing algorithm that integrates all rays arriving at a certain point in a scene to obtain an intensity of light reflected from this point into a camera, and performs the same recursive operation on these rays. Similarly, the Photon Mapping is also an optical path tracing algorithm, and records results of each incidence before light reaches a lens in a map to obtain illumination information, and then is enabling to interpolate the illumination information to smooth the results. The Photon Mapping is a more positive and fast convergent global illumination algorithm and generally has lower computational complexity than the Path Tracing.

A real-time global illumination method is mainly applied to a real-time rendering engine. The real-time rendering engine includes: modeling software and a game engine. In view of a diversification of a technical route and principle of the real-time global illumination method, according to a consideration input range of technological realization, the real-time global illumination method may be roughly divided into a screen space algorithm and a world space algorithm. Characteristics of these algorithms is that, while considering quality, it is also required to consider a computational cost of single frames, adaptation of hardware and a rendering Application Programming Interface (API), and a less data transfer volume of a Central Processing Element (CPU) and a Graphics Processing Element (GPU), thereby guaranteeing a stability of rendering per frame and maintaining a high frame rate.

Since the present disclosure mainly focuses on a game engine, the following will be focused on a global illumination calculation method in a real-time field.

A real-time global illumination technology is mainly divided into two technical routes: a screen space technical route and a world space technical route.

A screen space global illumination solution mainly includes: a Screen Space Ambient Occlusion (SSAO). An Ambient Occlusion (AO) is mainly used for simulating soft shadows generated on at least one object by skylights which are large-area light sources. An image with an AO technology may better distinguish a distance and a sense of volume of the at least one object. The SSAO uses depth information of a screen space to calculate a geometric occlusion of a scene. It is only used one layer depth information for calculation in the general SSAO technology.

Compared with a screen space global illumination solution, a world space solution achieves better technical results. A reason is that three-dimensional data of the entire scene is taken into consideration, and will not appear defects of the screen space global illumination solution in this rendering method. For example, data is incomplete and an AO object close to a camera will interfere with a distant object AO. Therefore, a calculated value of this rendering method is also closer to a definite solution.

The world space global illumination solution provided by the related art includes: a Voxel Ambient Occlusion (VXAO) for a game plug-in of Nvidia based on a model voxel abstraction method, a Voxel Global Illumination (VXGI), and a Sparse Voxel Octree Total illumination (SVOTI) for a Cryengine (which is a sub-era game engine produced by a German company Crytek, having representative games: Crysis, Far Cry Series, and Son of Rome) engine. In addition, the world space global illumination solution further includes: a DFAO and a DFGI of an unreal engine based on a Signed Distance Field (SDF) method.

Based on a voxel technology, a principle of the world space global illumination solution is introduced as follows. At least one voxel is formed in a GPU to store geometric and illumination information of a scene, that is, the voxel is a three-dimensional representation of pixel. And the scene constructed by voxel data visualization is similar to a performance of Microsoft Minecraft game. Voxel generation is generally performed in the GPU. Geometric patch information of the scene is subjected to three-dimensional rasterizing and stored in a three-dimensional texture. The greater resolution of the at least one voxel represents the finer of a scene object. When the voxel data is generated, global illumination may be calculated by using a voxel cone tracing technology.

However, a main drawback of a voxel abstraction method is that the CPU and the GPU have a large amount of data transmission and cannot complete a wide range of wild scenes and a large number of skeletal animation models. Because in three-dimensional rasterizing of models, the geometric information of the models are filled in a three-dimensional map, and achieves high filling rates. In particular, an increase in a resolution of the three-dimensional map is very rapid for an increase of the calculated data. In the condition of many models in an entire scene are dynamic or characters are moving quickly, there will causes a high data load or generates the load. When at least one model has skeletal animation, this method requires a new voxel rasterization to at least one model in each frame, and also injects this part of data into global data.

Based on an SDF technology, a principle of the world space global illumination solution is to reconstruct data for a scene through SDFs. A method used by Epic's unreal engine 4 is to generate local SDF data for each object off line and to combine features of DX11 in game rendering, so that an object distance field (which is a scalar field, distance to the nearest surface in a storage space) within a ray and visible range may be subjected to bounding box intersection in a world space, and sphere tracing is performed by using the distance field. On the other hand, the unreal engine 4 does not store direct illumination of objects, so an indirect illumination implementation of the unreal engine 4 is a technology combining a distance field and a virtual point light.

However, a main drawback of the SDF technology is that specular reflection is not supported. A DFGI of an unreal engine is taken as an example. Global illumination is calculated by using a directional distance field generated off line. The DFGI also cannot support the objects with dynamic skeletal animations. Not only that, since the DFGI of the unreal engine has distance field information without scene illumination information, the DFGI cannot support specular reflection rendering. At the same time, indirect illumination of the DFGI is implemented by using virtual point lights, a small number of virtual point lights achieve a poor effect on simulation of indirect illumination, and an increased number of virtual point lights will cause a huge overhead.

At the same time, it should also be pointed out that implementation of the technical solutions provided in the above related art all require the help of advanced features of DirectX 11. Due to a higher performance overhead, the technical solutions provided in the above related art are difficult to support objects with skeletal animations and are not suitable for being implemented in an online game engine.

In view of the above problems, no effective solution has yet been proposed.

SUMMARY

At least some embodiments of the present disclosure provide a global illumination calculation method and apparatus, so as at least to partially solve technical problems of global illumination calculation methods in the related art that a large amount of hardware resources are consumed and presented image effects are not ideal enough.

In one embodiment of the present disclosure, a global illumination calculation method is provided, which includes the steps as follows:

acquiring at least one of Signed Distance Field (SDF) information and illumination information corresponding to each of preselected pixels displayed on a screen, and the SDF information and illumination information corresponding to each pixel are stored in a two-dimensional map formed by mapping a three-dimensional map; and performing global illumination calculation according to at least one of the SDF information and the illumination information corresponding to each pixel.

In an optional embodiment, acquiring the illumination information corresponding to each pixel includes: rasterizing the two-dimensional map, and mapping a location of each pixel in the two-dimensional map to obtain a location in a world coordinate of a corresponding voxel in the three-dimensional map; mapping the location of each voxel in the world coordinate to a display space of the screen to obtain corresponding screen display coordinates; and extracting the illumination information corresponding to the screen display coordinates from an image data of a current frame.

In an optional embodiment, acquiring the SDF information corresponding to each pixel includes: rasterizing the two-dimensional map, and mapping a location of each pixel in the two-dimensional map to obtain a location in a world coordinate of a corresponding voxel in the three-dimensional map by mapping a location of each pixel in the two-dimensional map; mapping the location of each voxel in the world coordinate to a display space of the screen to obtain corresponding screen display coordinates; respectively calculating a world location distance between the location of each voxel and the location in the world coordinate restored, according to a depth map of the screen, from the corresponding screen display coordinates, and defining the world location distance within a preset value range; and acquiring SDF information and illumination information corresponding to image data of a previous frame adjacent to image data of a current frame displayed in the screen, calculating a corresponding world location distance of each pixel on the image data of the previous frame, and performing weighted average calculation based on a corresponding world location distance of each pixel on the image data of the current frame and the corresponding world location distance of each pixel on the image data of the previous frame to obtain the SDF information corresponding to each pixel.

In an optional embodiment, performing global illumination calculation according to the at least one of SDF information and illumination information corresponding to each pixel includes: determining at least one sampling point of each pixel to be used during a process of the global illumination calculation; acquiring a plurality of adjacent voxels according to the location in the world coordinate of the voxel corresponding to each sampling point in the three-dimensional map; performing repeated iterative correction on SDF information and illumination information corresponding to each pixel by using SDF information and illumination information of a plurality of adjacent voxels to obtain adjusted SDF information and illumination information corresponding to each pixel; and performing the global illumination calculation by using at least one of the adjusted SDF information and illumination information corresponding to each pixel.

In an optional embodiment, performing the global illumination calculation by using at least one of the adjusted SDF information and illumination information corresponding to each pixel includes at least one of the following: performing mean occlusion calculation by tracing the adjusted SDF information corresponding to cones uniformly distributed in a plurality of directions in a hemispherical surface located in an orientation of a world normal of a starting sampling point, corresponding to each pixel, at a surface of an object to be rendered to obtain Ambient Occlusion (AO) information; performing voxel cone tracing by tracing the adjusted SDF information and illumination information corresponding to cones uniformly distributed in a plurality of directions in a hemispherical surface located in an orientation of a world normal of a starting sampling point, corresponding to each pixel, at a surface of an object to be rendered to obtain indirect illumination information; and, performing, according to an incident ray in a viewpoint direction and a reflected ray in the orientation of the world normal of the starting sampling point, corresponding to each pixel, at a surface of an object to be rendered, sphere tracing through adjusted SDF information corresponding to each voxel to obtain specular reflection information.

In an optional embodiment, after performing the global illumination calculation according to at least one of the SDF information and the illumination information corresponding to each pixel, the method further includes: smoothing a global illumination calculation result by using temporal Antialiasing (AA), and upsampling a resolution adopted during selection of a plurality of pixels to a full resolution of the screen, and the global illumination calculation result includes at least one of the following: AO information, indirect illumination information, and specular reflection information.

In another embodiment of the present disclosure, a global illumination calculation apparatus is also provided, which includes: an acquisition component, arranged to acquire at least one of Signed Distance Field (SDF) information and illumination information corresponding to each of preselected pixels displayed on a screen, and the SDF information and illumination information corresponding to each pixel are stored in a two-dimensional map formed by mapping a three-dimensional map; and a calculation component, arranged to perform global illumination calculation according to at least one of the SDF information and the illumination information corresponding to each pixel.

In an optional embodiment, the acquisition component includes: a first mapping element, arranged to rasterize the two-dimensional map, and map a location of each pixel in the two-dimensional map to obtain a location in a world coordinate of a corresponding voxel in the three-dimensional map; a second mapping element, arranged to map the location of each voxel in the world coordinate to a display space of the screen to obtain corresponding screen display coordinates; and a first acquisition element, arranged to extract the illumination information corresponding to the screen display coordinates from an image data of a current frame.

In an optional embodiment, the acquisition component includes: a first mapping element, arranged to rasterize the two-dimensional map, and map a location of each pixel in the two-dimensional map to obtain a location in a world coordinate of a corresponding voxel in the three-dimensional map by mapping a location of each pixel in the two-dimensional map; a second mapping element, arranged to map the location of each voxel in the world coordinate to a display space of the screen to obtain corresponding screen display coordinates; a first calculation element, arranged to respectively calculate a world location distance between the location of each voxel in the world coordinate and the location in the world coordinate restored, according to a depth map of the screen, from the corresponding screen display coordinates, and define the world location distance within a preset value range; and a second acquisition element, arranged to acquire SDF information and illumination information corresponding to image data of a previous frame adjacent to image data of a current frame of displayed on the screen, calculate a corresponding world location distance of each pixel on the image data of the previous frame, and perform weighted average calculation based on a corresponding world location distance of each pixel on the image data of the current frame and the corresponding world location distance of each pixel on the image data of the previous frame to obtain the SDF information corresponding to each pixel.

In an optional embodiment, the calculation component includes: a determination element, arranged to determine at least one sampling point of each pixel to be used during a process of the global illumination calculation; a third acquisition element, arranged to acquire a plurality of adjacent voxels according to a location in the world coordinate of the voxel corresponding to each sampling point in the three-dimensional map; an adjustment element, arranged to perform repeated iterative correction on SDF information and illumination information corresponding to each pixel by using SDF information and illumination information of a plurality of adjacent voxels to obtain adjusted SDF information and illumination information corresponding to each pixel; and a second calculation element, arranged to perform the global illumination calculation by using at least one of the adjusted SDF information and illumination information corresponding to each pixel.

In an optional embodiment, the second calculation element is arranged to perform at least one of the following operation: performing mean occlusion calculation by tracing the adjusted SDF information corresponding to cones uniformly distributed in a plurality of directions in a hemispherical surface located in an orientation of a world normal of a starting sampling point, corresponding to each pixel, at a surface of an object to be rendered to obtain Ambient Occlusion (AO) information; performing voxel cone tracing by tracing the adjusted SDF information and illumination information corresponding to cones uniformly distributed in a plurality of directions in a hemispherical surface located in an orientation of a world normal of a starting sampling point, corresponding to each pixel, at a surface of an object to be rendered to obtain indirect illumination information; and performing according to an incident ray in a viewpoint direction and a reflected ray in the orientation of the world normal of the starting sampling point, corresponding to each pixel, at a surface of an object to be rendered, sphere tracing through adjusted SDF information corresponding to each voxel to obtain specular reflection information.

In an optional embodiment, the device further includes: a processing component, arranged to smooth a global illumination calculation result by using temporal Antialiasing (AA), and upsample a resolution adopted during selection of a plurality of pixels to a full resolution of the screen, and the global illumination calculation result includes at least one of the following: AO information, indirect illumination information, and specular reflection information.

In the embodiments of the present disclosure, SDF information and illumination information of a voxel corresponding to each pixel selected on the screen are stored in the two-dimensional map mapped from the three-dimensional map, when it is necessary to calculate global illumination for the pixel, at least one of the SDF information and the illumination information of the voxel corresponding to the pixel is acquired from the two-dimensional map, the and global illumination is calculated by using at least one of the acquired SDF information and illumination information. Thus, technical effects of reducing the calculation amount of global illumination, reducing the consumption of hardware resources and improving image display are achieved, thereby solving the technical problems of global illumination calculation methods in the related art that a large amount of hardware resources are consumed and the presented image effects are not ideal enough.

DETAILED DESCRIPTION

In order to make those skilled in the art better understand the solutions of the present disclosure, the technical solutions in the embodiments of the present disclosure will be described clearly and completely in the following with reference to the accompanying drawings in the embodiments of the present disclosure. Obviously, the described embodiments are only a part of the embodiments of the present disclosure and not all of the embodiments. All other embodiments obtained by those of ordinary skill in the art based on the embodiments of the present disclosure without creative efforts shall fall within the protection scope of the present disclosure.

It should be noted that the specification and claims of the present disclosure and terms "first", "second" and the like in the drawings are used to distinguish similar objects, and do not need to describe a specific sequence or a precedence order. It should be understood that objects used in such a way may be exchanged under appropriate conditions, in order that the embodiments of the present disclosure described here may be implemented in a sequence except sequences graphically shown or described here. In addition, terms "including" and "having" and any variations thereof are intended to cover non-exclusive inclusions. For example, processes, methods, systems, products or devices containing a series of steps or elements do not need to clearly show those steps or elements, and may include other inherent steps or elements of these processes, methods, products or devices, which are not clearly shown.

In one embodiment of the present disclosure, a global illumination calculation method is provided. It should be noted that the steps shown in the flowchart of the drawings may be performed in a computer system such as a set of computer-executable instructions, and although a logical order is shown in the flowchart, in some cases, the illustrated or described steps may be performed in an order other than the above.

Figure 1:
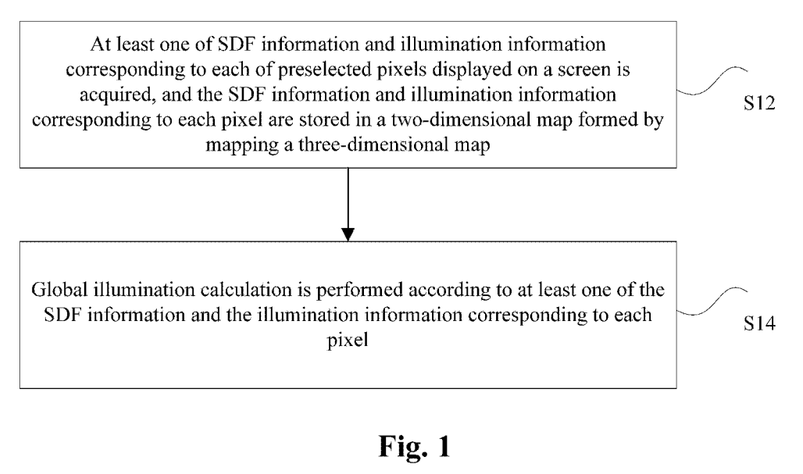
FIG. 1 is a flowchart of a global illumination calculation method according to an embodiment of the present disclosure.

FIG. 1 is a flowchart of a global illumination calculation method according to an embodiment of the present disclosure. According to an embodiment as shown in FIG. 1, the method includes the steps as follows.

At step S12, at least one of SDF information and illumination information corresponding to each of preselected pixels displayed on a screen is acquired, and the SDF information and illumination information corresponding to each pixel are stored in a two-dimensional map formed by mapping a three-dimensional map.

At step S14, global illumination calculation is performed according to at least one of the SDF information and the illumination information corresponding to each pixel.

The global illumination calculation method provided in the related art has a high GPU consumption and a large amount of calculation. This method has a relatively high requirement for a computer hardware configuration and is generally suitable for a console game. However, this method is not suitable for an online game.

Specifically, there is a large amount of data transmission of each frame of a CPU and a GPU, or the data needs to be pre-processed off line. A method of global illumination in world space mainly establishes information of whole scene in the GPU for global illumination calculation. This information mainly includes direct illumination of a scene and geometric information of the scene. Game scenes are generally very large, and some of the game scenes require seamless loading of maps. Therefore, a transmission performance of these data from the CPU to the GPU is one of the bottlenecks of an entire global illumination system. Moreover, since at least DirectX 10 or more is required to support three-dimensional texture writing, the method of global illumination in world space used in a forefront of game rendering in the industrial field requires the use of some features of a higher graphic API to be efficiently implemented. In contrast, by adopting the technical solutions provided by at least some embodiments of the present disclosure, the SDF information and the illumination information corresponding to each pixel are stored in the two-dimensional map mapped from the three-dimensional map, thereby reducing the amount of data transmission between the CPU and the GPU, and further reducing the use of data bandwidth from the CPU to the GPU. In addition, since the amount of data transmission between the CPU and the GPU is reduced, it is possible to achieve the same image effect while occupying less system resources than the solutions of the related art, and also to achieve a better image effect while occupying the same system resources as the solutions of the related art.

In an exemplary implementation process, a material information bus (including, but not limited to, material color, normal, and material rendering parameters) is mainly used for decoupling the materials from illumination in a rendering coloring process, generating a material bus for a non-transparent material in a screen, and then calculating an illumination result, thereby avoiding illumination calculation of an occluded location, typically such as GBuffer. A material information bus of a current frame in deferred rendering is used for filling illumination information and SDF information into a voxel map. The illumination information and distance field data are stored according to an SDF. The illumination information is stored in Red Green Blue (RGB) components of the voxel map, and the SDF information is stored in an Alpha channel of the voxel map.

Since the embodiment provided by the present disclosure uses a DirectX 9 rendering framework instead of a DirectX 10 rendering framework used in the related art, and DirectX 9 supports a writing of a two-dimensional map, it is necessary to map the two-dimensional map into a three-dimensional map. That is, the voxel map uses a two-dimensional map to store three-dimensional data. Data writing and reading require separate mapping of locations. Three-dimensional data UV needs to be mapped to two-dimensional map UV. Specifically, the three-dimensional map is firstly expanded in two dimensions according to depth, and multiple tiled two-dimensional maps are used for implementing the three-dimensional map. If these tiled two-dimensional maps are re-stacked together, the above three-dimensional map may be restored. Assuming that a resolution of a three-dimensional voxel is set to 128*128*128, it is necessary to generate a two-dimensional map corresponding to a size of 16384 (i.e., 128*128)*128.

Further, since a reading of the two-dimensional map may perform linear interpolation between two-dimensional u and v, if it is desired to restore three-dimensional linear interpolation of u, v, and w of the three-dimensional map, it is necessary to read, in the two-dimensional map, two nearest tangent planes (i.e., data in two small cubes) corresponding to w coordinates in the two-dimensional map, and then to interpolate data in these two planes, so as to simulate a function of the three-dimensional map. The two coordinate points are defined as uv1 and uv2, corresponding to the following mapping formulas:

$uv2=\text{float2}((\text{floor}(\text{Cell}.z)+1+\text{Cell}.x/\text{SDF\_VOL-}$
$\text{UME\_WIDTH})/\text{SDF\_VOLUME\_DEPTH},1.0f-$
$\text{Cell}.y/\text{SDF\_VOLUME\_HEIGHT})$ $uv1=\text{float2}((\text{floor}(\text{Cell}.z)+\text{Cell}.x/\text{SDF\_VOL-}$
$\text{UME\_WIDTH})/\text{SDF\_VOLUME\_DEPTH},1.0f-$
$\text{Cell}.y/\text{SDF\_VOLUME\_HEIGHT})$ in which float2 represents a vector, respectively having x and y values, separated by commas; Cell represents access of coordinate values of three-dimensional data in a local space, and SDF_VOLUME_WIDTH, SDF_VOLUME_HEIGHT, and SDF_VOLUME_DEPTH are respectively the maximum width, maximum height and maximum depth of a voxel map.

In an optional embodiment, in step S12, the step that illumination information corresponding to each pixel is acquired may include the following execution steps.

At step S120, the two-dimensional map is rasterized, and a location in a world coordinate of a corresponding voxel in the three-dimensional map is obtained in a manner of mapping a location of each pixel in the two-dimensional map.

At step S121, the location of each voxel in the world coordinate is mapped to a display space of the screen to obtain corresponding screen display coordinates.

At step S122, the illumination information corresponding to the screen display coordinates is extracted from an image data of a current frame.

Firstly, the two-dimensional map mapped to three-dimensional data is rasterized, and the location of each pixel is mapped back to a location in a world coordinate of the three-dimensional data. Secondly, the location of each voxel in a world coordinate is mapped into a screen space to obtain UV coordinates corresponding to the screen. And then, illumination information corresponding to the UV coordinates is extracted from an image data of a current frame observed from a current point of view (e.g., a camera). In addition, the illumination information may also be calculated on line by using a simple Lambert's model.

It should be noted that a result of shadow calculation is needed by deferred rendering in this step of calculation. That is, in order to make data injected into three-dimensional voxels have shadow information, it is necessary to be coordinated with shadow map by deferred rendering, so as to generate the illuminant information of voxel data.

In an optional embodiment, in step S12, the step that SDF information corresponding to each pixel is acquired may include the following execution steps.

At step S123, the two-dimensional map is rasterized, and a location in a world coordinate of a corresponding voxel in the three-dimensional map is obtained by mapping a location of each pixel in the two-dimensional map.

At step S124, the location of each voxel in the world coordinate is mapped to a display space of the screen to obtain corresponding screen display coordinates.

At step S125, a world location distance between the location of each voxel in the world coordinate and the location in the world coordinate restored according to a depth map of the screen, from the corresponding screen display coordinates is calculated respectively, and the world location distance is defined within a preset value range.

At step S126, SDF information and illumination information corresponding to image data of a previous frame adjacent to a image data of the current frame displayed on the screen are acquired, a corresponding world location distance of each pixel on the image data of the previous frame is calculated, and weighted average calculation is performed based on a corresponding world location distance of each pixel on the image data of the current frame and the corresponding world location distance of each pixel on the image data of the previous frame to obtain the SDF information corresponding to each pixel.

An SDF is a scalar field, for storing a distance from each spatial location to the nearest triangular surface. The calculation flow for this data is as follows.

Firstly, the two-dimensional map mapped to three-dimensional data is rasterized, and the location of each pixel is mapped back to a location of the three-dimensional data in the world coordinate. Secondly, the location of each voxel in the world coordinate is mapped into a screen space so as to obtain UV coordinates corresponding to the screen. And then, if the voxel belongs to a visible range of the screen, a distance (i.e., a distance between two points of a three-dimensional world) between the location of the voxel in the world coordinate and the location in the world coordinate restored by a sampling screen depth map (i.e., data of a corresponding pixel in the depth map is obtained) for the UV coordinates, corresponding to the location of the voxel in the world coordinate, at the screen is calculated. And finally, the world location distance is truncated to form a value range with maximum and minimum bounds (i.e., the distance value obtained in the previous step is truncated within a range) by a Level of Detail (LOD) to obtain a Truncated Signed Distance Field (TSDF), and weighted average calculation is performed between data of the SDF and data corresponding to the previous frame.

In view of that the technical solutions provided by the at least some embodiments of the present disclosure are mainly applicable to online games and other general rendering environments, the calculation of global illumination covers a fairly large range. In order to ensure global light generation in a large area, and in order to ensure sufficient accuracy by means of calculation results near the screen, it is necessary to introduce a Level of Detail (LOD) system. An LOD technology is a rendering optimization solution for reducing corresponding details according to a distance of a camera. A Clipmap is a kind of LOD technology, with the principle of that high-precision data is used for wrapping a close-shot part of the camera while low-precision data is used for wrapping a long-shot part of the camera.

In an exemplary embodiment, the implementation of LOD technology is to respectively generate three-dimensional data that has the same resolution but corresponding to different scene ranges, to wrap the camera and follow the camera to move. The lowest level of an LOD range is the smallest and the highest accuracy is achieved in generating elements of the three-dimensional data. The highest level of LOD level whose accuracy is the lowest, but the LOD range is the largest. In other words, high-precision data is generated in a space close to the camera, and low-precision data is generated in a space far away from the camera. This ensures that the close-shot part has a better effect of image presentation in the case of lower memory consumption, so that it can be guaranteed that a user has a better result of global light rendering when viewing the close-shot image, and the long-shot part can also have a relatively moderate effect of image presentation.

Based on the above introduction, the data preparation work before the global illumination calculation is as follows. Three-dimensional voxel data is used for storing dynamically generated world SDF information and illumination information represented by world space coordinates corresponding to a world SDF, high-precision data is used for wrapping a camera close-range area, and low-precision data is used for wrapping a camera remote area. That is, a Clipmap+LOD mode may be used for covering a camera-centered cube area, in order to save memory footprint. By utilizing a depth map rendered by a current frame and generated by a deferred rendering technology of a conventional game engine, voxel data within the warped range of frustum of the camera is updated. The SDF information is calculated by restoring world coordinates via the depth map, and the direct illumination information is calculated by utilizing of diffuse reflection. At this time, SDF information and direct illumination voxel data for reconstruction of the entire scene is obtained. Since the current data is obtained by weighted average calculation of the SDF information and the data of the previous frame, the data preparation is completed after a filtering process. When an image effect is obtained by using the SDF, and the image effect is to be improved through a rendering technology (e.g., AO, indirect illumination, and reflection), the above globally and dynamically generated data may be used. The data not only can achieve the effect of global illumination, but also can achieve the effects of soft shadows, specular reflections, and physical collisions.

In an optional embodiment, in step S14, the step that the global illumination calculation is performed according to at least one of the SDF information and the illumination information corresponding to each pixel may include the following execution steps.

At step S140, at least one sampling point of each pixel to be used during a process of the global illumination calculation is determined.

At step S141, multiple adjacent voxels are acquired according to the location in the world coordinate of the voxel corresponding to each sampling point in the three-dimensional map.

At step S142, repeated iterative correction is performed on SDF information and illumination information corresponding to each pixel by using SDF information and illumination information of multiple adjacent voxels to obtain adjusted SDF information and illumination information corresponding to each pixel.

At step S143, the global illumination calculation is performed by using at least one of the adjusted SDF information and illumination information corresponding to each pixel.

Since fused data directly opposite to the camera is usually in the highest proportion, in the case where a range of truncated distance is not small enough, the data has a large directional deviation from a standard SDF. However, if the truncated range is smaller, a frequency of tracing required for a voxel map rendering technology is higher subsequently. In other words, because the depth map shot by the camera generates the distance field, an effectiveness of preferential data generation is mainly biased toward the camera direction. There is an error between the generated distance field and a standard distance field definition.

Therefore, an optimization method by using a minimum distance paradigm may be attempted, so that existing SDF data will be approximate to a correct result after multiple iterations.

In an exemplary implementation process, assuming that a current cube O includes six faces, a cube Q adjacent to each side of the cube O (that is, a adjacent voxel in a three-dimensional map, a side length of the voxel is corresponding to offset of the uv coordinates) is iteratively found. A center distance between the two cubes is d. From a direction of the camera toward a surface of an object, the surface of the object may be set as an origin, a plane outside the surface of the object may be set as a forward direction (which is represented with a plus sign), and a plane inside the surface of the object may be set to a reverse direction (which is represented with a minus sign).

If the cube O and the cube Q are both with plus signs or the cube O and the cube Q are both with minus signs, an estimate distance of the cube O (i.e., distance of Q+d) is calculated according to the previously generated SDF information (distance) stored in the cube Q. The smaller value between the previously generated SDF information (distance) and the estimate distance stored in the cube O is stored. Convergence is the best case.

If one of the cube O and the cube Q is with a plus sign while the other one is with a minus sign, under the condition of d is smaller than a distance between centers of circles, an intersection point between a common chord of the two circles and a connecting line of the two circles is taken as a hypothetical surface zero point, and thus calculating a distance between the intersection point and the cube. That is, a storage distance between two adjacent cubes distance may be regarded as the radius of two circles, a connecting line of the two circles is a common cord of the two circles, and an intersection point between the connecting line of two centers of circles and the common cord is an approximation point to be calculated.

By repeatedly calculating the cube O and six adjacent cubes according to the above calculation method, at least one of adjusted SDF information and illumination information is finally obtained.

In an optional embodiment, in step S142, the step that the global illumination calculation is performed by using at least one of the adjusted SDF information and illumination information corresponding to each pixel may include at least one of the following execution steps.

At step S1420, mean occlusion calculation is performed by tracing the adjusted SDF information corresponding to cones uniformly distributed in multiple directions in a hemispherical surface located in an orientation of a world normal of a starting sampling point, corresponding to each pixel, at a surface of an object to be rendered to obtain AO information.

Global illumination is divided into two parts: AO and indirect illumination. For calculation efficiency, the same sampling point data is reused in both of the calculations.

A process of sampling point distribution is introduced as follows. A starting sampling point is a location in a world coordinate converted by a current screen pixel according to a depth map. At the same time, a world normal corresponding to the pixel is obtained according to the screen coordinates of the pixels, and the orientation of a patch corresponding to the pixel is obtained. In an exemplary implementation process, illumination and occlusion information is traced in nine directions evenly distributed in the orientation of the patch respectively at the starting sampling point, and ten steps of tracing sampling are performed in each direction. Finally, the calculation results of the nine directions are averaged, to obtain a final result. It should be noted that cones formed in the nine directions are distributed as far as possible and occupy a hemispherical surface in a normal direction of the tracing surface.

In a calculation process of AO, a calculation formula for AO in each step of sampling is as follows:

$$StepVisibility = Distance/Sphere\ Radius$$

in which StepVisibility is a visibility of each step of sampling, Distance is an SDF, SphereRadius is a radius of a bottom circle of a cone, of which a starting sampling point is a conical tip, and a sampling point is a section center of the cone. This is an approximation method for linearly calculating a visibility of a specific solid angle direction by using an SDF. Meanwhile, since at least some embodiments provided by the present disclosure may use the TSDF, SphereRadius also is to be truncated in the same maximum value of SDF.

A StepVisibility value with the lowest visibility in a current direction is recorded in each direction:

ConeVisibility=min(StepVisibility,ConeVisibility)

After obtaining the AO value in each direction, a corresponding pixel may be calculated by using an AO formula provided in the related art. This will not be repeated here.

At step S1421, voxel cone tracing is performed by tracing the adjusted SDF information and illumination information corresponding to cones uniformly distributed in multiple directions is traced in a hemispherical surface located in an orientation of a world normal of a starting sampling point, corresponding to each pixel, at a surface of an object to be rendered to obtain indirect illumination information.

In a calculation process of indirect illumination, similar to the calculation of the AO, a world coordinate of a pixel is firstly restored by using a screen depth. This coordinate is used as a starting point, from which illumination information is collected in nine directions respectively. Since the previously generated SDF data is provided with illumination information, it is possible to trace adjusted SDF information and illumination information corresponding to cones uniformly distributed in multiple directions in a hemispherical surface in the orientation of a world normal of a voxel corresponding to each pixel to perform voxel cone tracing, so as to obtain an indirect illumination calculation result.

At step S1422, according to an incident ray in a viewpoint direction and a reflected ray in the orientation of the world normal of the starting sampling point, corresponding to each pixel, at a surface of an object to be rendered, sphere tracing is performed through adjusted SDF information corresponding to each voxel to obtain specular reflection information.

In a calculation process of specular reflection, a world coordinate of each pixel is restored by using the depth value of the screen, and this coordinate is used as a starting point to perform Sphere Tracing by using SDF data in a camera-directed incident ray and a reflection direction of a pixel surface normal. At a tracing end point, illumination information of this point is acquired.

Sphere Tracing is a method of tracing an SDF. Sphere Tracing is mainly used for searching a surface location of the nearest distance from a starting point to a specific direction. A principle of Sphere Tracing is mainly as follows. An SDF is used for iterating a step length of each tracing, and a value of the SDF at a current tracing point is added to each recursion process of the step length. The stored data of the SDF is the distance from the corresponding location to the nearest surface, which is consistent with a setting function of Sphere Tracing. Therefore, Sphere Tracing is a very efficient method for ray tracing in the SDF.

In an optional embodiment, after step S14, the global illumination calculation is performed according to at least one of the SDF information and the illumination information corresponding to each pixel, the method may further include the following execution step.

At step S16, a global illumination calculation result is smoothed by using temporal AA, and a resolution adopted during selection of multiple pixels is upsampled to a full resolution of the screen, and the global illumination calculation result includes at least one of the following: AO information, indirect illumination information, and specular reflection information.

A Temporal Antialiasing (AA) technology is an antialiasing method. A working principle of the Temporal AA is as follows. Multi-frame data is used for super-sampling a result identifying the same pixel rendering. The most significant difference from a traditional antialiasing technology is that data for super-sampling a pixel through the traditional technology derives from locations near to the pixel to render more results, and Temporal AA is to distribute data to be sampled in multi-frame rendering results. Therefore, Temporal AA can achieve a better antialiasing effect with lower hardware and software resource consumption.

Temporal AA is able to effectively remap most of data from a previous frame to a current frame location. In this case, it is necessary to save a camera matrix of the previous frame to calculate a pixel 2D velocity field of the current frame. Temporal AA correctly maps more data of the previous frame, and the super-sampling result will be better.

Since global illumination belongs to intermediate frequency information, and the calculation of the global illumination is a GPU-intensive operation, rendering may be performed at a lower resolution to reduce an overall calculation amount, and then a depth map and a normal of GBuffer are used for performing bidirectional filtering to a full-screen resolution. The problems caused by upsampling are data hopping and information loss. Therefore, introducing Temporal AA here may reduce the problem of data hopping and sampling accuracy to some extent.

In an exemplary implementation, the global light tracing calculation takes place at one-eighth of the resolution of the screen, bidirectional filtering upsampling (which is a texture sampling method) is performed to half of the resolution, and then upsampling is performed to a full resolution by using Temporal AA.

Figure 2:
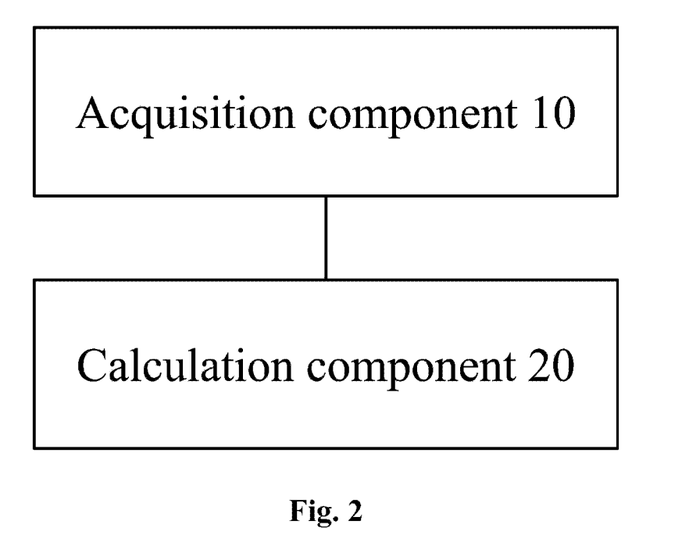
FIG. 2 is a structural block diagram of a global illumination calculation apparatus according to an embodiment of the present disclosure.

In another embodiment of the present disclosure, a global illumination calculation apparatus is provided. FIG. 2 is a structural block diagram of a global illumination calculation apparatus according to an embodiment of the present disclosure. According to an embodiment as shown in FIG. 2, the global illumination calculation apparatus may include: an acquisition component 10, arranged to acquire at least one of SDF information and illumination information corresponding to each of preselected pixels displayed on a screen, and the SDF information and illumination information corresponding to each pixel are stored in a two-dimensional map formed by mapping a three-dimensional map; and a calculation component 20, arranged to perform global illumination calculation according to at least one of the SDF information and the illumination information corresponding to each pixel.

Figure 3:
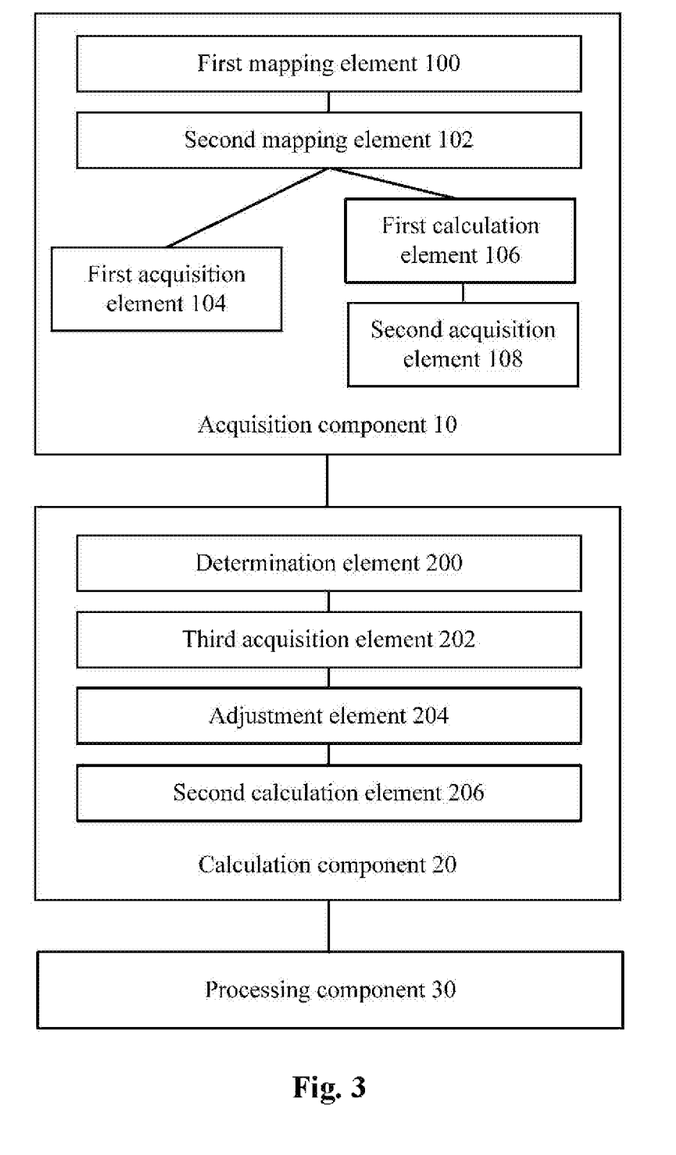
FIG. 3 is a structural block diagram of a global illumination calculation apparatus according to an exemplary embodiment of the present disclosure.

In an optional embodiment, FIG. 3 is a structural block diagram of a global illumination calculation apparatus according to an exemplary embodiment of the present disclosure. According to an embodiment as shown in FIG. 3, the acquisition component 10 includes: a first mapping element 100, arranged to rasterize the two-dimensional map, and map a location of each pixel in the two-dimensional map to obtain a location in a world coordinate of a corresponding voxel in the three-dimensional map; a second mapping element 102, arranged to map the location of each voxel in the world coordinate to a display space of the screen to obtain corresponding screen display coordinates; and a first acquisition element 104, arranged to extract the illumination information corresponding to the screen display coordinates from an image data of a current frame.

In an optional embodiment, according to the embodiment as shown in FIG. 3, the acquisition component 10 includes: a first mapping element 100, arranged to rasterize the two-dimensional map, and map a location of each pixel in the two-dimensional map to obtain a location in a world coordinate of a corresponding voxel in a three-dimensional map by mapping a location of each pixel in the two-dimensional map; a second mapping element 102, arranged to map the location of each voxel in the world coordinate to a display space of the screen to obtain corresponding screen display coordinates; a first calculation element 106, arranged to respectively calculate a world location distance between the location of each voxel in the world coordinate and the location in the world coordinate restored, according to a depth map of the screen, from the corresponding screen display coordinates, and define the world location distance within a preset value range; and a second acquisition element 108, arranged to acquire SDF information and illumination information corresponding to image data of a previous frame adjacent to image data of a current frame displayed on the screen, calculate a corresponding world location distance of each pixel on the image data of the previous frame, and perform weighted average calculation based on a corresponding world location distance of each pixel on the image data of the current frame and the corresponding world location distance of each pixel on the image data of the previous frame to obtain the SDF information corresponding to each pixel.

In an optional embodiment, according to the embodiment as shown in FIG. 3, the calculation component 20 includes: a determination element 200, arranged to determine at least one sampling point of each pixel to be used during a process of the global illumination calculation; a third acquisition element 202, arranged to acquire multiple adjacent voxels according to a location in the world coordinate of the voxel corresponding to each sampling point in the three-dimensional map; an adjustment element 204, arranged to perform repeated iterative correction on SDF information and illumination information corresponding to each pixel by using SDF information and illumination information of multiple adjacent voxels to obtain adjusted SDF information and illumination information corresponding to each pixel; and a second calculation element 206, arranged to perform the global illumination calculation by using at least one of the adjusted SDF information and illumination information corresponding to each pixel.

In an optional embodiment, the second calculation element 206 is arranged to arranged to perform at least one of the following operation: performing mean occlusion calculation by tracing the adjusted SDF information corresponding to cones uniformly distributed in multiple directions in a hemispherical surface located in an orientation of a world normal of a starting sampling point, corresponding to each pixel, at a surface of an object to be rendered to obtain AO information; performing voxel cone tracing by tracing the adjusted SDF information and illumination information corresponding to cones uniformly distributed in multiple directions in a hemispherical surface located in an orientation of a world normal of a starting sampling point, corresponding to each pixel, at a surface of an object to be rendered to obtain indirect illumination information; and, performing according to an incident ray in a viewpoint direction and a reflected ray in the orientation of the world normal of the starting sampling point, corresponding to each pixel, at a surface of an object to be rendered, sphere tracing through adjusted SDF information corresponding to each voxel to obtain specular reflection information.

In an optional embodiment, according to the embodiment as shown in FIG. 3, the apparatus further includes: a processing component 30, arranged to smooth a global illumination calculation result by using temporal AA, and upsample a resolution adopted during selection of multiple pixels to a full resolution of the screen, and the global illumination calculation result includes at least one of the following: AO information, indirect illumination information, and specular reflection information.

The serial numbers of the embodiments of the present disclosure are used for descriptions, and do not represent the preference of the embodiments.

In the above-mentioned embodiments of the present disclosure, descriptions for each embodiment are emphasized respectively, and parts which are not elaborated in a certain embodiment may refer to relevant descriptions for other embodiments.

In some embodiments provided by the present application, it should be understood that the disclosed technical content may be implemented in another manner. For example, the apparatus embodiment described above is schematic. For example, division of the elements is logic function division, and other division manners may be adopted during practical implementation. For example, multiple elements or components may be combined or integrated into another system, or some characteristics may be neglected or not executed. In addition, coupling or direct coupling or communication connection between each displayed or discussed component may be indirect coupling or communication connection, implemented through some interfaces, of the elements or the components, and may be electrical and mechanical or adopt other forms.

The above-mentioned elements described as separate parts may or may not be physically separated, and parts displayed as elements may or may not be physical elements, and namely may be located in the same place, or may also be distributed to multiple network elements. Part or all of the elements may be selected to achieve the purpose of the solutions of the present embodiment according to a practical requirement.

In addition, each function element in each embodiment of the present disclosure may be integrated into a processing element, each element may also exist independently. And two or more than two elements may also be integrated into a element. The above-mentioned integrated element may be implemented in a form of hardware, and may also be implemented in a form of software function element.

When being implemented in form of software function element and sold or used as an independent product, the integrated element may also be stored in a computer-readable storage medium. Based on such an understanding, the technical solutions of the present disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the present disclosure. The above-mentioned memory includes: various media capable of storing program codes such as a U disk, a Read-Only Memory (ROM), a Random Access Memory (RAM), a mobile hard disk, a magnetic disk or an optical disk.

The above description are exemplary embodiments of the present disclosure, and it should be pointed out that those skilled in the art may also make several improvements and remodeling without deviating from the principle of the present disclosure. These improvements and retouching should be regarded as the protection scope of the present disclosure.

What is claimed is:

1. A global illumination calculation method, comprising:
acquiring at least one of Signed Distance Field (SDF) information and illumination information corresponding to each of preselected pixels displayed on a screen, wherein the SDF information and illumination information corresponding to each pixel are stored in a two-dimensional map formed by mapping a three-dimensional map; and
performing global illumination calculation according to at least one of the SDF information and the illumination information corresponding to each pixel;
wherein acquiring the illumination information corresponding to each pixel comprises: rasterizing the two-dimensional map, and mapping a location of each pixel in the two-dimensional map to obtain a location in a world coordinate of a corresponding voxel in the three-dimensional map; mapping the location of each voxel in the world coordinate to a display space of the screen to obtain corresponding screen display coordinates; and extracting the illumination information corresponding to the screen display coordinates from an image data of a current frame;
wherein acquiring the SDF information corresponding to each pixel comprises: rasterizing the two-dimensional map, and mapping a location of each pixel in the two-dimensional map to obtain a location in a world coordinate of a corresponding voxel in the three-dimensional map by mapping a location of each pixel in the two-dimensional map; mapping the location of each voxel in the world coordinate to a display space of the screen to obtain corresponding screen display coordinates; respectively calculating a world location distance between the location of each voxel in the world coordinate and the location in the world coordinate restored according to a depth map of the screen, from the corresponding screen display coordinates, and defining the world location distance within a preset value range; and acquiring SDF information and illumination information corresponding to image data of a previous frame adjacent to image data of a current frame displayed on the screen, calculating a corresponding world location distance of each pixel on the image data of the previous frame, and performing weighted average calculation based on a corresponding world location distance of each pixel on the image data of the current frame and the corresponding world location distance of each pixel on the image data of the previous frame to obtain the SDF information corresponding to each pixel.

2. The method as claimed in claim 1, wherein performing the global illumination calculation according to at least one of the SDF information and the illumination information corresponding to each pixel comprises:
determining at least one sampling point of each pixel to be used during a process of the global illumination calculation;
acquiring a plurality of adjacent voxels according to the location in the world coordinate of the voxel corresponding to each sampling point in the three-dimensional map;
performing repeated iterative correction on SDF information and illumination information corresponding to each pixel by using SDF information and illumination information of a plurality of adjacent voxels to obtain adjusted SDF information and illumination information corresponding to each pixel; and
performing the global illumination calculation by using at least one of the adjusted SDF information and illumination information corresponding to each pixel.

3. The method as claimed in claim 2, wherein performing the global illumination calculation by using at least one of the adjusted SDF information and illumination information corresponding to each pixel comprises at least one of the following:
performing mean occlusion calculation by tracing the adjusted SDF information corresponding to cones uniformly distributed in a plurality of directions in a hemispherical surface located in an orientation of a world normal of a starting sampling point, corresponding to each pixel, at a surface of an object to be rendered to obtain Ambient Occlusion (AO) information;
performing voxel cone tracing by tracing the adjusted SDF information and illumination information corresponding to cones uniformly distributed in a plurality of directions in a hemispherical surface located in an orientation of a world normal of a starting sampling point, corresponding to each pixel, at a surface of an object to be rendered to obtain indirect illumination information; and,
performing, according to an incident ray in a viewpoint direction and a reflected ray in the orientation of the world normal of the starting sampling point, corresponding to each pixel, at a surface of an object to be rendered, sphere tracing through adjusted SDF information corresponding to each voxel to obtain specular reflection information.

4. The method as claimed in claim 3, wherein the starting sampling point is a location in the world coordinate transformed from a pixel of a current screen according to a depth map of the screen.

5. The method as claimed in claim 3, wherein the adjusted SDF information and illumination information corresponding to cones uniformly distributed is traced in nine directions evenly distributed in an orientation of a patch respectively at the starting sampling point, and ten steps of tracing sampling are performed in each direction.

6. The method as claimed in claim 1, wherein after performing the global illumination calculation according to at least one of the SDF information and the illumination information corresponding to each pixel, the method further comprises:
smoothing a global illumination calculation result by using temporal Antialiasing (AA), and upsampling a resolution adopted during selection of a plurality of pixels to a full resolution of the screen, wherein the global illumination calculation result comprises at least one of the following: AO information, indirect illumination information, and specular reflection information.

7. The method as claimed in claim 6, wherein before upsampling the resolution adopted during selection of the plurality of pixels to the full resolution of the screen, the method further comprises:
performing a global light tracing calculation at one-eighth of a resolution of the screen, and performing bidirectional filtering upsampling to a half of the resolution of the screen.

8. The method as claimed in claim 1, wherein performing global illumination calculation according to at least one of the SDF information and the illumination information corresponding to each pixel comprises:
    determining at least one sampling point of each pixel to be used during a process of the global illumination calculation;
    acquiring a plurality of adjacent voxels according to the location in the world coordinate of the voxel corresponding to each sampling point in the three-dimensional map;
    performing repeated iterative correction on SDF information and illumination information corresponding to each pixel by using SDF information and illumination information of a plurality of adjacent voxels to obtain adjusted SDF information and illumination information corresponding to each pixel; and
    performing the global illumination calculation by using at least one of the adjusted SDF information and illumination information corresponding to each pixel.

9. The method as claimed in claim 1, wherein before acquiring at least one of the SDF information and the illumination information corresponding to each of pixels, the method further comprises:
    filling the illumination information and the SDF information into a voxel map by using a material information bus of a current frame in deferred rendering, wherein the illumination information is stored in Red Green Blue (RGB) components of the voxel map and the SDF information is stored in an Alpha channel of the voxel map.

10. The method as claimed in claim 1, wherein the illumination information corresponding to the screen display coordinates is extracted from the image data of the current frame observed from a current point of view.

11. The method as claimed in claim 1, wherein defining the world location distance within the preset value range comprises:
    truncating the world location distance to form a value range with maximum and minimum bounds by a Level of Detail (LOD) to obtain a Truncated Signed Distance Field (TSDF).

12. A global illumination calculation apparatus, comprising:
    an acquisition component, arranged to acquire at least one of Signed Distance Field (SDF) information and illumination information corresponding to each of preselected pixels displayed on a screen, wherein the SDF information and illumination information corresponding to each pixel are stored in a two-dimensional map formed by mapping a three-dimensional map; and
    a calculation component, arranged to perform global illumination calculation according to at least one of the SDF information and the illumination information corresponding to each pixel;
    wherein the acquisition component comprises: a first mapping element, arranged to rasterize the two-dimensional map, and map a location of each pixel in the two-dimensional map to obtain a location in a world coordinate of a corresponding voxel in the three-dimensional map; a second mapping element, arranged to map the location of each voxel in the world coordinate to a display space of the screen to obtain corresponding screen display coordinates; and a first acquisition element, arranged to extract the illumination information corresponding to the screen display coordinates from an image data of a current frame; wherein the acquisition component comprises: a first mapping element, arranged to rasterize the two-dimensional map, and map a location of each pixel in the two-dimensional map to obtain a location in a world coordinate of a corresponding voxel in the three-dimensional map by mapping a location of each pixel in the two-dimensional map; a second mapping element, arranged to map the location of each voxel in the world coordinate to a display space of the screen to obtain corresponding screen display coordinates; a first calculation element, arranged to respectively calculate a world location distance between the location of each voxel in the world coordinate and the location in the world coordinate restored, according to a depth map of the screen, from the corresponding screen display coordinates, and define the world location distance within a preset value range; and a second acquisition element, arranged to acquire SDF information and illumination information corresponding to image data of a previous frame adjacent to image data of a current frame displayed on the screen, calculate a corresponding world location distance of each pixel on the image data of the previous frame, and perform weighted average calculation based on a corresponding world location distance of each pixel on the image data of the current frame and the corresponding world location distance of each pixel on the image data of the previous frame to obtain the SDF information corresponding to each pixel.

13. The apparatus as claimed in claim 12, wherein the calculation component comprises:
    a determination element, arranged to determine at least one sampling point of each pixel to be used during a process of the global illumination calculation;
    a third acquisition element, arranged to acquire a plurality of adjacent voxels according to a location in the world coordinate of the voxel corresponding to each sampling point in the three-dimensional map;
    an adjustment element, arranged to perform repeated iterative correction on SDF information and illumination information corresponding to each pixel by using SDF information and illumination information of a plurality of adjacent voxels to obtain adjusted SDF information and illumination information corresponding to each pixel; and
    a second calculation element, arranged to perform the global illumination calculation by using at least one of the adjusted SDF information and illumination information corresponding to each pixel.

14. The apparatus as claimed in claim 13, wherein the second calculation element is arranged to perform at least one of the following operation: performing mean occlusion calculation by tracing the adjusted SDF information corresponding to cones uniformly distributed in a plurality of directions in a hemispherical surface located in an orientation of a world normal of a starting sampling point, corresponding to each pixel, at a surface of an object to be rendered to obtain Ambient Occlusion (AO) information; performing voxel cone tracing by tracing the adjusted SDF information and illumination information corresponding to cones uniformly distributed in a plurality of directions in a hemispherical surface located in an orientation of a world normal of a starting sampling point, corresponding to each pixel, at a surface of an object to be rendered to obtain indirect illumination information; and performing according to an incident ray in a viewpoint direction and a reflected ray in the orientation of the world normal of the starting sampling point, corresponding to each pixel, at a surface of an object to be rendered, sphere tracing through adjusted SDF information corresponding to each voxel to obtain specular reflection information.

15. The apparatus as claimed in claim 12, further comprising:
   a processing component, arranged to smooth a global illumination calculation result by using temporal Antialiasing (AA), and upsample a resolution adopted during selection of a plurality of pixels to a full resolution of the screen, wherein the global illumination calculation result comprises at least one of the following: AO information, indirect illumination information, and specular reflection information.

16. The apparatus as claimed in claim 12, wherein the calculation component comprises:
   a determination element, arranged to determine at least one sampling point of each pixel to be used during a process of the global illumination calculation;
   a third acquisition element, arranged to acquire a plurality of adjacent voxels according to a location in the world coordinate of the voxel corresponding to each sampling point in the three-dimensional map;
   an adjustment element, arranged to perform repeated iterative correction on SDF information and illumination information corresponding to each pixel by using SDF information and illumination information of a plurality of adjacent voxels to obtain adjusted SDF information and illumination information corresponding to each pixel; and
   a second calculation element, arranged to perform the global illumination calculation by using at least one of the adjusted SDF information and illumination information corresponding to each pixel.

* * * * *